(12) United States Patent
Yokoyama

(10) Patent No.: US 9,430,009 B2
(45) Date of Patent: Aug. 30, 2016

(54) ELECTRONIC APPARATUS CAPABLE OF CONTROLLING POWER USAGE, CONTROL METHOD THEREFOR, AND STORAGE MEDIUM

(71) Applicant: CANON KABUSHIKI KAISHA, Tokyo (JP)

(72) Inventor: Hidehiko Yokoyama, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 315 days.

(21) Appl. No.: 14/079,695

(22) Filed: Nov. 14, 2013

(65) Prior Publication Data

US 2014/0157019 A1 Jun. 5, 2014

(30) Foreign Application Priority Data

Dec. 5, 2012 (JP) ................. 2012-266224

(51) Int. Cl.
*G06F 1/32* (2006.01)
*G06F 1/26* (2006.01)

(52) U.S. Cl.
CPC .............. *G06F 1/26* (2013.01); *G06F 1/3206* (2013.01); *G06F 1/329* (2013.01); *G06F 1/3284* (2013.01); *Y02B 60/1267* (2013.01); *Y02B 60/144* (2013.01)

(58) Field of Classification Search
CPC ...... G06F 1/26; G06F 1/3206; G06F 1/3284; G06F 1/329; Y02B 60/1267; Y02B 60/144
USPC ......................................... 713/320
See application file for complete search history.

(56) References Cited

U.S. PATENT DOCUMENTS 8,250,384 B2 * 8/2012 Borghetti .............. G06F 1/3203
713/300

FOREIGN PATENT DOCUMENTS

JP 2011-239306 A 11/2011

* cited by examiner

*Primary Examiner* — Kim Huynh
*Assistant Examiner* — Justin T Ahn
(74) *Attorney, Agent, or Firm* — Rossi, Kimms & McDowell LLP

(57) ABSTRACT

An electronic apparatus capable of controlling power usage without interfering with execution of processes. When the electronic apparatus is requested to execute a process, it is determined whether or not power consumption while the requested process is executed is greater than a predetermined amount of power. When it is determined that the power consumption is greater than the predetermined amount of power, power required to execute the requested process is borrowed from another electronic apparatus. When the power required to execute the requested process is borrowed, the requested process is executed.

7 Claims, 7 Drawing Sheets

| PROCESS | POWER CONSUMPTION |
|---|---|
| COPYING | 700W |
| FINISHING | 500W |

302

| PROCESS | POWER CONSUMPTION |
|---|---|
| COPYING | 700W |
| FINISHING | 500W |

303

| PRESCRIBED POWER | 700W |
|---|---|
| EFFECTIVE POWER | 700W |
| BORROWED POWER | 0W |
| LENDER | — |
| LENT POWER | 0W |
| BORROWER | — |

304

| PRESCRIBED POWER | 1500W |
|---|---|
| EFFECTIVE POWER | 1000W |
| BORROWED POWER | 0W |
| LENDER | — |
| LENT POWER | 500W |
| BORROWER | MFP-A |

ELECTRONIC APPARATUS CAPABLE OF CONTROLLING POWER USAGE, CONTROL METHOD THEREFOR, AND STORAGE MEDIUM

BACKGROUND OF THE INVENTION

1. Field of the Invention

The present invention relates to an electronic apparatus, a control method therefor, and a computer-readable storage medium storing a program for implementing the control method.

2. Description of the Related Art

Electricity prices are calculated based on power usage within a calculation time period such as one month. Therefore, a setting value is determined for power usage within a calculation time period, and this is allocated to apparatuses so that the total amount of power used by the apparatuses can be prevented from exceeding the setting value, and electricity prices be kept at a predetermined level or less (see, for example, Japanese Laid-Open Patent Publication (Kokai) No. 2011-239306).

On the other hand, when there is a demand for power exceeding the amount of power to be supplied, a power outage may occur, and hence it is necessary to adjust the amount of power to be supplied based on an expected demand for power. It is, however, difficult to immediately change the amount of power to be supplied.

In general, a demand for power reaches a peak in a specific time period such as daytime on weekdays and it is thus necessary to cut this peak and prevent a power demand from exceeding the amount of power to be supplied.

To facilitate this, there has been introduced a system called a demand response in which electricity unit prices are cut based on an upper limit to power consumption. Accordingly, there has been proposed a peak cut technique that controls apparatuses such that maximum power consumption never exceeds a value determined in advance (Japanese Laid-Open Patent Publication (Kokai) No. 2011-239306).

By reducing power usage during a calculation time period for electricity prices, electricity prices can be kept at a certain level or lower, but unless an integrated value of power usage during that time period exceeds a setting value, apparatuses may use power to a maximum extent, and hence power consumption cannot be equalized.

On the other hand, according to the peak cut technique, in general, power consumption is allocated to apparatuses, which are targets to be controlled, based on maximum power consumption determined in advance, and the apparatuses operate with power consumption allocated thereto.

In this case, however, limitations have to be placed on operations so that processes can be performed with allocated power consumption, and hence in a period of time for which peak cut is required, desired operations may not be carried out.

SUMMARY OF THE INVENTION

The present invention provides an electronic apparatus and a control method therefor which are capable of controlling power usage without interfering with execution of processes, as well as a computer-readable storage medium storing a program for implementing the control method.

Accordingly, a first aspect of the present invention provides an electronic apparatus comprising a determination unit configured to, in a case where the electronic apparatus is requested to execute a process, determine whether power consumption for executing the requested process is greater than a predetermined amount of power, a notification unit configured to, in a case where the determination unit determines that the power consumption for executing the requested process is greater than the predetermined amount of power, notify another electronic apparatus that the power consumption for executing the requested process is greater than the predetermined amount of power, and an execution unit configured to, after the notification unit notify the other electronic apparatus that the power consumption for executing the requested process is greater than the predetermined amount of power, execute the requested process, wherein the other electronic apparatus which has received a notification from the notification unit is limited to execute requested another process.

Accordingly, a second aspect of the present invention provides a control method for an electronic apparatus comprising a determination step of, in a case where the electronic apparatus is requested to execute a process, determining whether power consumption for executing the requested process is greater than a predetermined amount of power, a notification step of, in a case where it is determined in the determination step that the power consumption for executing the requested process is greater than the predetermined amount of power, notifying another electronic apparatus that the power consumption for executing the requested process is greater than the predetermined amount of power, and an execution step of, after the notification unit notify the other electronic apparatus that the power consumption for executing the requested process is greater than the predetermined amount of power, executing the requested process, wherein the other electronic apparatus which has received a notification from the notification unit is limited to execute requested another process.

Accordingly, a third aspect of the present invention provides a non-transitory computer-readable storage medium storing a program for causing a computer to execute a control method for an electronic apparatus, the control method comprising a determination step of, in a case where the electronic apparatus is requested to execute a process, determining whether power consumption for executing the requested process is greater than a predetermined amount of power, a notification step of, in a case where it is determined in the determination step that the power consumption for executing the requested process is greater than the predetermined amount of power, notifying another electronic apparatus that the power consumption for executing the requested process is greater than the predetermined amount of power, and an execution step of, after the notification unit notify the other electronic apparatus that the power consumption for executing the requested process is greater than the predetermined amount of power, executing the requested process, wherein the other electronic apparatus which has received a notification from the notification unit is limited to execute requested another process.

According to the present invention, power usage can be controlled in the electronic apparatus without interfering with execution of processes.

Further features of the present invention will become apparent from the following description of exemplary embodiments (with reference to the attached drawings).

BRIEF DESCRIPTION OF THE DRAWINGS

FIG. 3 is a diagram showing power consumption tables and power borrowing-lending tables managed by an MFP-A 202 and an MFP-B 203 appearing in FIG. 1.

DESCRIPTION OF THE EMBODIMENTS

The present invention will now be described in detail with reference to the drawings showing an embodiment thereof.

Figure 1:
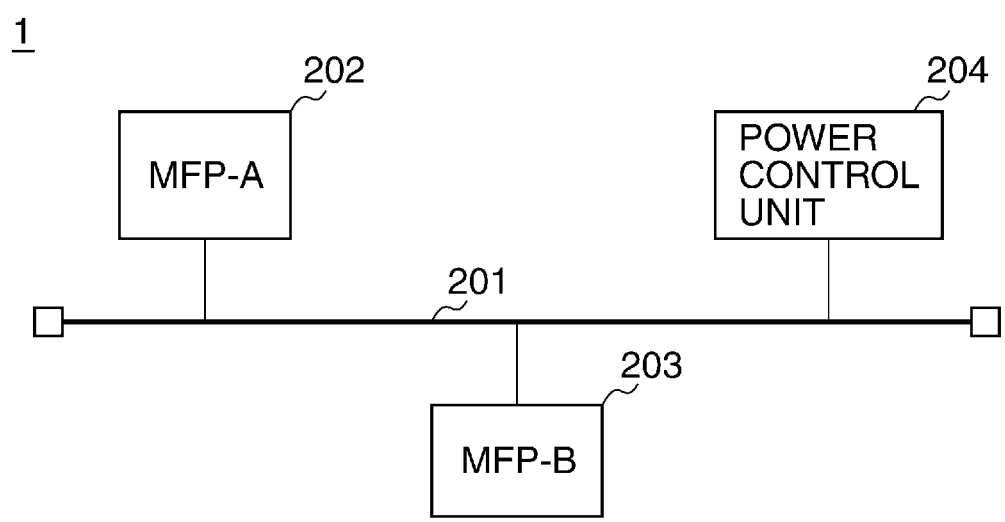
FIG. 1 is a diagram schematically showing an arrangement of an image forming system including image forming apparatuses according to an embodiment of the present invention.

FIG. 1 is a diagram schematically showing an arrangement of an image forming system 1 including image forming apparatuses (hereafter referred to as "MFPs") according to the present embodiment.

Referring to FIG. 1, an MFP-A 202, an MFP-B 203, and a power control apparatus 204 are connected to a LAN (local area network) 201, and these apparatuses are capable of sending and receiving data to and from each other via the LAN 201.

The MFP-A 202 and the MFP-B 203 carry out processes based on printing requests or the like received from an information processing apparatus such as a PC, not shown, via the LAN 201, and processes based on operations performed by users via operation panels, to be described later.

Figure 2:
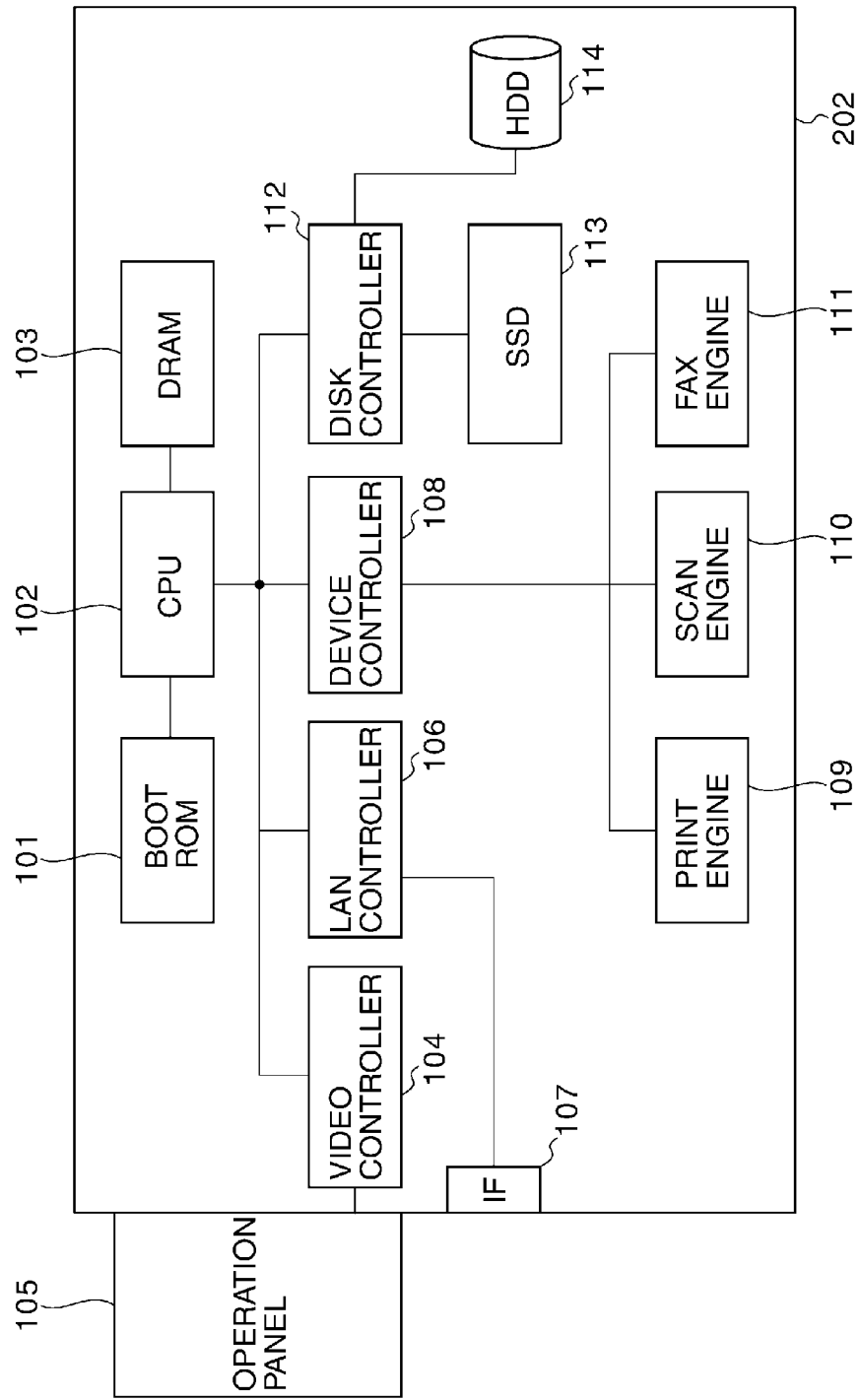
FIG. 2 is a diagram schematically showing an arrangement of MFPs appearing in FIG. 1.

FIG. 2 is a diagram schematically showing an arrangement of the MFPs appearing in FIG. 1.

The arrangement shown in FIG. 2 shows an arrangement of the MFP-A 202 and the MFP-B 203 in FIG. 1, but here, the MFP-A 202 is taken as an example.

The MFP-A 202 has a boot ROM 101, a CPU 102, a DRAM 103, a video controller 104, an operation panel 105, a LAN controller 106, a LAN interface 107, a device controller 108, a print engine 109, a scan engine 110, a fax engine 111, a disk controller 112, an SSD (solid state drive) 113, and an HDD (hard disk drive) 114.

When power is supplied to the MFP-A 202, the CPU 102 executes an initialization program stored in the boot ROM 101. Also, at the end of an initialization process in accordance with the initialization program stored in the boot ROM 101, the CPU 102 copies apparatus control programs stored in the HDD 114 to the DRAM 103 and successively executes the apparatus control programs.

The video controller 104 controls screen information which is output to the operation panel 105, and the LAN controller 106 sends and receives information to and from a network to which the LAN controller 106 is connected via the LAN interface 107.

The device controller 108 controls the print engine 109, the scan engine 110, and the fax engine 111. The disk controller 112 controls the SSD 113 and the HDD 114 in which program files, data files, and so on are stored.

FIG. 3 is a diagram showing power consumption tables and power borrowing-lending tables managed by the MFP-A 202 and the MFP-B 203.

Referring to FIG. 3, a power consumption table 301 and a power borrowing-lending table 303 are managed by the MFP-A 202, and a power consumption table 302 and a power borrowing-lending table 304 are managed by the MFP-B 203. The power consumption tables 301 and 302 are stored in the HDD 114 or the SSD 113 of the apparatuses. The power borrowing-lending table 303 and 304 are stored in the DRAM 103 of the apparatuses.

The power consumption tables 301 and 302 are power consumption tables showing power required to execute each of processes carried out by the electronic apparatus. In the example shown in FIG. 3, for both the MFP-A 202 and the MFP-B 203, there is shown power consumed to perform copying in which an image is read off an original and printed on a printing medium, and finishing in which a printed-out printing medium is subjected to processing such as punching, stapling, and folding.

FIG. 3 also indicates that power consumed by either of the MFP-A 202 and the MFP-B 203 is 700 W for copying and 500 W for finishing. Thus, maximum power consumption for finishing-copying is 1200 W.

The power borrowing-lending tables 303 and 304 are comprised of prescribed power, effective power, borrowed power, lender, lent power, and borrower.

Prescribed power indicates maximum power consumption (power determined in advance) allocated by the power control apparatus 204. Effective power indicates maximum power consumption (predetermined power) at which operation is prohibited in the MFP.

Borrowed power indicates power borrowed from another apparatus. Lender indicates an IP address or a name that can identify another apparatus from which power is borrowed.

Lent power indicates power lent to another apparatus. Borrower indicates an IP address or a name that can identify another apparatus to which power is lent.

It should be noted that when no power is borrowed or lent, effective power is equal to prescribed power. On the other hand, as power is borrowed or lent, effective power increases or decreases, and the apparatus operates using increased or decreased effective power as an upper limit to power consumption.

Figure 4:
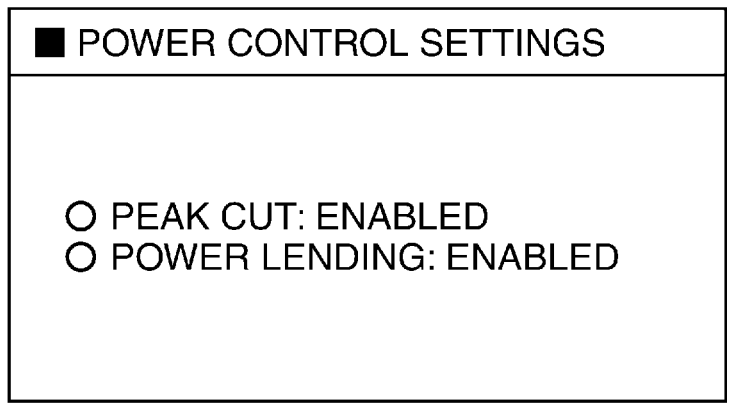
FIG. 4 is a view showing an exemplary user interface relating to power control settings displayed on an operation panel appearing in FIG. 2.

FIG. 4 is a view showing an exemplary user interface relating to power control settings displayed on the operation panel 105 appearing in FIG. 2.

On the user interface in FIG. 4, a setting as to whether or not to enable a peak cut function of limiting the maximum value of power consumption and a setting as to whether or not to enable power borrowing-lending from and to another apparatus when the peak cut function is enabled can be made.

FIGS. 5A to 5D are views showing exemplary network data structures sent and received between the MFPs.

Figure 5A:
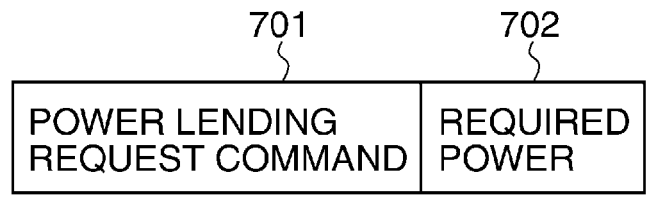
FIGS. 5A to 5D are views showing exemplary network data structures sent and received between the MFPs.

FIG. 5A shows a network data structure of a power lending request. This power lending request is comprised of a power lending request command 701 and required power 702.

The power lending request command 701 indicates what type of data is the network data, and the required power 702 indicates power required from a destination.

Figure 5B:
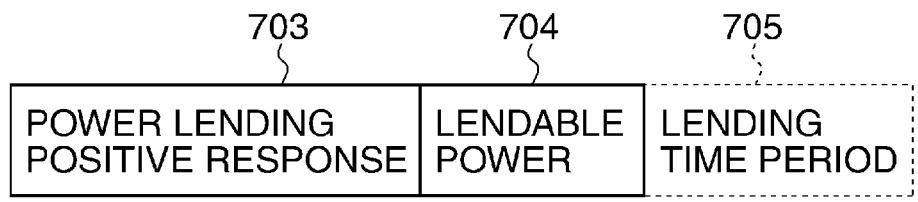

FIG. 5B shows a network data structure of a power lending acknowledgement. This power lending acknowledgement is comprised of a power lending positive response 703, lendable power 704, and a lending time period 705, which is added when necessary.

The power lending acknowledgement 703 indicates what type of data is the network data. The lendable power 704 indicates power that can be lent to a requestor. The lending time period 705 indicates a time period for which power can be lent, and this need not to be added when no time period is set.

It should be noted that when an apparatus which has received a power lending request does not acknowledge this request, nothing is sent to a sender which has sent the power lending request. Thus, a sender of a power lending request cannot borrow power when it does not receive a power lending acknowledgement even after a predetermined time period has elapsed.

Figure 5C:
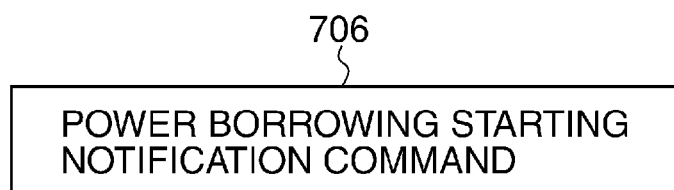

FIG. 5C shows a network data structure of a power borrowing starting notification. This power borrowing starting notification is comprised of a power borrowing starting notification command 706, and notifies an MFP which lends power that borrowing of power is going to be started.

Figure 5D:

FIG. 5D shows a network data structure of a power borrowing completion notification. This power borrowing completion notification is comprised of a power borrowing completion notification command 707, and notifies an MFP which has lent power, that borrowing of power has been completed.

Figure 6:
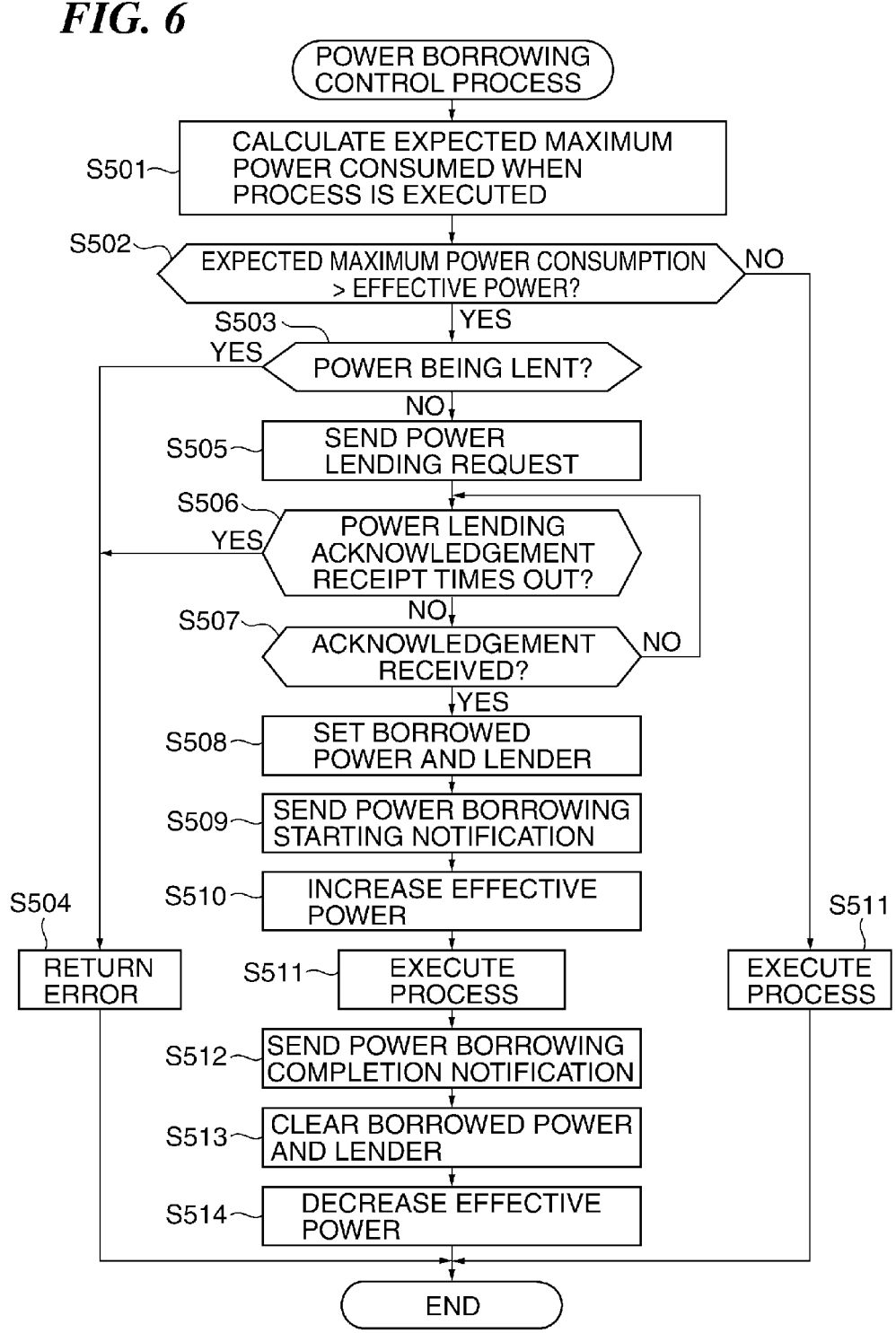
FIG. 6 is a flowchart showing the procedure of a power borrowing control process carried out by a CPU in FIG. 2.

FIG. 6 is a flowchart showing the procedure of a power borrowing control process carried out by the CPU 102 appearing in FIG. 2.

In the description referring to FIG. 6, it is assumed that, for example, the MFP-A 202 borrows power from the MFP-B 203 so as to make the process easily understood.

For example, in response to a finishing-copying request from a user via the operation panel 105, the CPU 102 of the MFP-A 202 uses the power consumption table 301 to calculate expected maximum power consumed when a requested process is executed (step S501). The expected maximum power consumption is calculated using the power consumption table 301.

The CPU 102 of the MFP-A 202 then determines whether or not the expected maximum power consumption is greater than effective power shown in the power borrowing-lending table 303 (step S502: determination unit). For example, according to the power consumption table 301, the MFP-A 202 consumes power of 1200 W at the maximum when carrying out finishing-copying, but according to the power borrowing-lending table 303, effective power is 700 W, and hence the expected maximum power consumption is greater than effective power.

When, as a result of the determination in the step S502, the expected maximum power consumption is not greater than effective power shown in the power borrowing-lending table 303 (NO in the step S502), the CPU 102 of the MFP-A 202 carries out the requested process (step S511) and terminates the present process.

On the other hand, when, as a result of the determination in the step S502, the expected maximum power consumption is greater than effective power shown in the power borrowing-lending table 303 (YES in the step S502), the CPU 102 of the MFP-A 202 determines whether or not power has already been lent to another apparatus (step S503). This determination is made based on whether or not lent power in the power borrowing-lending table 303 is greater than 0 W.

When, as a result of the determination in the step S503, power has already been lent to another apparatus (YES in the step S503), the CPU 102 of the MFP-A 202 returns an error (step S504) because necessary functions may not be realized if power is lent, and then terminates the present process.

For example, a finishing-copying request is an instruction from a user via the operation panel 105, the CPU 102 of the MFP-A 202 displays, at the time of returning an error in the step S504, on the operation panel 105 a message saying that designated operations cannot be performed due to power shortage.

On the other hand, when, as a result of the determination in the step S503, power is not being lent to another apparatus (NO in the step S503), the CPU 102 of the MFP-A 202 broadcasts the power lending request shown in FIG. 5A to apparatuses connected to the LAN 201 (step S505). In this example, the CPU 102 of the MFP-A 202 sends the power lending request to the MFP-B 203.

Also, in this example, when the requested process is finishing-copying, a shortfall in power required to carry out this process is 500 W which is obtained by subtracting effective power of 700 W from the expected maximum power consumption is 1200 W, and hence the required power 702 in the power lending request is set at 500 W. This required power 702 of 500 W is power that should be borrowed from another apparatus so as to carry out finishing-copying.

The CPU 102 of the MFP-A 202 then starts a timer to wait for receipt of the power lending acknowledgement shown in FIG. 5B, and when the timer expires (YES in step S506), the process proceeds to the step S504 because the CPU 102 of the MFP-A 202 cannot carry out a process in response to the power lending request.

On the other hand, when the timer for waiting for receipt of the power lending acknowledgement does not expire (NO in the step S506), and the power lending acknowledgement is received (YES in step S507), the CPU 102 of the MFP-A 202 sets borrowed power and lender in the power borrowing-lending table 303 (step S508). The steps S505 to S508 correspond to a borrowing unit.

The CPU 102 of the MFP-A 202 then sends the power borrowing starting notification shown in FIG. 5C to an apparatus that has sent the power lending acknowledgement, and borrows power from this apparatus (step S509). The CPU 102 of the MFP-A 202 then increases effective power by an amount corresponding to the power borrowed in the step S509 (step S510) and carries out finishing-copying (step S511: execution unit).

Upon completing finishing-copying, the CPU 102 of the MFP-A 202 sends the power borrowing completion notification shown in FIG. 5D to the apparatus that has lent power (step S512).

The CPU 102 of the MFP-A 202 then clears borrowed power and lender in the power borrowing-lending table 303 (step S513), decreases effective power to prescribed power (step S514), and terminates the present process.

As described above, when the MFP-A 202 borrows power of 500 W from the MFP-B 203, effective power of the MFP-A 202 increases from 700 W, which is prescribed power, to 1200 W, and finishing-copying is carried out. After finishing-copying is completed, effective power of the MFP-A 202 decreases to 700 W which is equal to prescribed power.

As in the steps S509 and S512, when a requested process is to be carried out, notification that borrowing of power is going to be started is given to another apparatus that lends power, and when the requested process is completed, notification that borrowing of power has been completed is given to the apparatus that has lent power.

Figure 7:
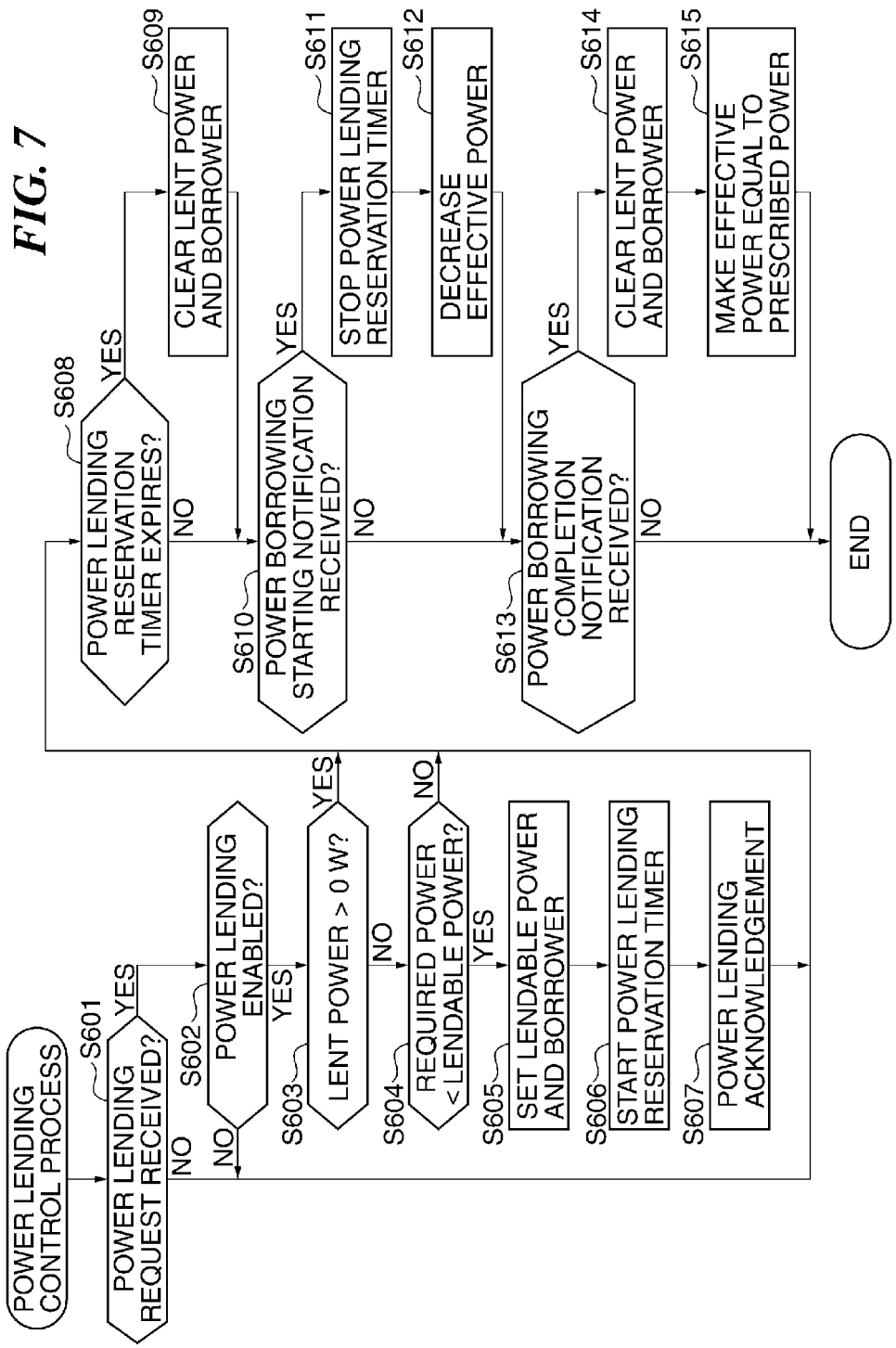
FIG. 7 is a flowchart showing the procedure of a power lending process carried out by the CPU appearing in FIG. 2.

FIG. 7 is a flowchart showing the procedure of a power lending process carried out by the CPU 102 appearing in FIG. 2. In the description referring to FIG. 7, it is assumed that, for example, the MFP-B 203 lends power to the MFP-A 202 so as to make the process easily understood.

Referring to FIG. 7, the CPU 102 of the MFP-B 203 determines whether or not it has received a power lending request from another apparatus (step S601). When, as a result of the determination in the step S601, the CPU 102 of the MFP-B 203 has not received a power lending request from another apparatus (NO in the step S601), the process proceeds to step S608.

On the other hand, when, as a result of the determination in the step S601, the CPU 102 of the MFP-B 203 has received a power lending request from another apparatus (YES in the step S601), the CPU 102 of the MFP-B 203 determines whether or not power borrowing is enabled (step S602). This determination is made based on whether or not power lending has been enabled on the user interface in FIG. 4.

When, as a result of the determination in the step S602, power borrowing is not enabled (NO in the step S602), the process proceeds to the step S608.

On the other hand, when, as a result of the determination in the step S602, power borrowing is enabled (YES in the step S602), the CPU 102 of the MFP-B 203 determines whether or not lent power in the power borrowing-lending table 304 is greater than 0 W (step S603).

When, as a result of the determination in the step S603, lent power in the power borrowing-lending table 304 is greater than 0 W (YES in the step S603), the CPU 102 of the MFP-B 203 determines that power cannot be lent any more, and the process proceeds to the step S608.

On the other hand, when, as a result of the determination in the step S603, lent power in the power borrowing-lending table 304 is not greater than 0 W (NO in the step S603), the CPU 102 of the MFP-B 203 determines whether or not the required power 702 specified in the power lending request is smaller than lendable power that can be lent by the MFP-B 203 (step S604: determination unit).

Here, lendable power is a value obtained by subtracting maximum power consumed to carry out a basic process, which is determined in advance and written in the first row of the power consumption tables 301 and 302, from effective power written in the power borrowing-lending table 304.

Thus, for example, the MFP-B 203 having received a request to lend power of 500 W from the MFP-A 202 can lend power of 800 W, which is obtained by subtracting 700 W from 1500 W, because maximum power consumed to carry out a copying process, which is a basic process in the power consumption table 302, is 700 W while effective power in the power borrowing-lending table 304 is 1500 W.

When, as a result of the determination in the step S604, the required power 702 specified in the power lending request is equal to or greater than lendable power (NO in the step S604), the CPU 102 of the MFP-B 203 determines that power cannot be lent, and hence the process proceeds to the step S608.

On the other hand, when, as a result of the determination in the step S604, the required power 702 specified in the power lending request is smaller than lendable power (YES in the step S604), the CPU 102 of the MFP-B 203 sets lent power and borrower in the power borrowing-lending table 304 (step S605).

Namely, 500 W is set as lent power, and an IP address of the MFP-A 202 is set as borrower in the power borrowing-lending table 304 of the MFP-B203.

The CPU 102 of the MFP-B 203 then starts a power lending reservation timer (step S606) and sends a power lending acknowledgement to an apparatus that has sent the power lending request (step S607). The steps S605 to S607 correspond to a lending unit.

The power lending reservation timer measures time until the lending time period 705 in FIG. 5B ends, and hence the step S606 is executed in the case where the lending time period 705 is set. Thus, the step S606 is not executed in the case where the lending time period 705 is not set.

Even when the MFP-B 203 determines as a result of calculation that lendable power is 800 W, 500 W which is the required power 702 is set as the lendable power 704 because the required power 702 required by the MFP-A 202 is 500 W.

Then, the CPU 102 of the MFP-B 203 determines whether or not the power lending reservation timer has expired (step S608).

When, as a result of the determination in the step S608, the power lending reservation timer has expired (YES in the step S608), the CPU 102 of the MFP-B 203 clears lent power and borrower in the power borrowing-lending table 304 (step S609), and the process proceeds to step S610. Thus, when notification that borrowing of power is going to be started is not provided by the MFP-A 202 within a time period determined in advance after required power is lent to the MFP-A 202, the CPU 102 of the MFP-B 203 cancels lending of power.

When lending of power is possible, the CPU 102 of the MFP-B 203 sends a power lending acknowledgement to the MFP-A 202 in the step S607, but when the MFP-A 202, which is a borrower, may not borrow power from the MFP-B 203. Thus, the power lending reservation timer is started in the step S606, and when the power lending reservation timer has expired, the CPU 102 of the MFP-B 203 determines that the MFP-A 202 has not borrowed power from the MFP-B 203 and returns to its normal state.

It should be noted that as a value at which the power lending reservation timer expires, a sufficient value determined with consideration given to a network delay and a processing time period in the apparatus is held as a prescribed value.

On the other hand, when, as a result of the determination in the step S608, the power lending reservation timer has not expired (NO in the step S608), the CPU 102 of the MFP-B 203 determines whether or not it has received a power borrowing starting notification (step S610).

When, as a result of the determination in the step S610, the CPU 102 of the MFP-B 203 has received a power borrowing starting notification (YES in the step S610), the CPU 102 of the MFP-B 203 stops the power lending reservation timer (step S611) and then decreases effective power by an amount corresponding to lent power (step S612), followed by the process proceeding to step S613.

On the other hand, when, as a result of the determination in the step S610, the CPU 102 of the MFP-B 203 has not received a power borrowing starting notification (NO in the step S610), the CPU 102 of the MFP-B 203 determines whether or not it has received a power borrowing completion notification (step S613).

When, as a result of the determination in the step S613, the CPU 102 of the MFP-B 203 has not received a power borrowing completion notification (NO in the step S613), the CPU 102 of the MFP-B 203 terminates the present process.

On the other hand, when, as a result of the determination in the step S613, the CPU 102 of the MFP-B 203 has received a power borrowing completion notification (YES in the step S613), the CPU 102 of the MFP-B 203 clears lent power and borrower in the power borrowing-lending table 304 (step S614), then sets effective power at a value equal to prescribed power (step S615), and terminates the present process.

For example, upon receipt of a power borrowing starting notification in a case where the MFP-B 203 lends power of 500 W to the MFP-B 203 when effective power is 1500 W, effective power decreases 500 W, which corresponds to lent power, from 1500 W to 1000 W.

Thus, the MFP-B 203 is able to carry out a copying process for which maximum power consumption is 700 W, but maximum power consumption for a finishing-copying process is 1200 W, and hence expected maximum power consumption exceeds effective power.

For this reason, when there is a finishing-copying request in a case where the MFP-B 203 carries out the process in the flowchart of FIG. 6, the process proceeds from the step S502 to the step S503 in the flowchart of FIG. 6, but an error is returned in the step S504 to terminate the process because power is being lent to the MFP-A 202.

As described above, according to the present embodiment, when expected maximum power consumption during execution of a requested process exceeds currently-set effective power, a power lending request is sent to a nearby apparatus. When a power lending acknowledgement is sent from the nearby apparatus, a power borrowing starting notification is sent to the nearby apparatus, and effective power temporarily increases.

The process is carried out with power borrowed from the nearby apparatus, and after completion of the process, effective power is returned to prescribed power, and a power borrowing completion notification is sent to the apparatus that sent the power lending acknowledgement.

On the other hand, the nearby apparatus that sent the power lending acknowledgement in response to the power lending request temporarily decreases effective power upon receiving the power borrowing starting notification, and then upon receiving the power borrowing completion notification, returns effective power to its original.

An MFP operates in such a manner as not to exceed prescribed power allocated in advance by the power control apparatus 204, which controls power of a plurality of MFPs within a power control area, and hence when one of the MFPs temporarily needs power exceeding effective power, it borrows power from the other one of the MFPs, so that necessary operations can be performed without exceeding maximum power set in the power control area.

It should be noted that in the embodiment described above, an MFP that lends power decreases effective power upon receiving a power borrowing starting notification from an MFP that borrows power, and increases effective power to prescribed power upon receiving a power borrowing completion notification.

For this reason, when a process by an MFP that borrows power is very long, limitations may be placed on an MFP that lends power during the time period for which the process is carried out in a case where the MFP that lend power tries to carry out a process requiring power exceeding effective power.

To cope with this problem, the power lending time period 705 is set in a reply to a power lending request as shown in FIG. 5B.

Because the power lending time period 705 does not limit a processing time period for an MFP that borrows power, the MFP that borrows power may calculate a time period required for a process as well as maximum power consumption for the process, and only when both values do not exceed a value set in a power lending acknowledgement which is a response to a power lending request, it may be determined that power can be borrowed.

Thus, in the present embodiment, a time period for which power can be borrowed from another electronic apparatus is determined in advance, and when a time period required to carry out a requested process is equal to or shorter than the power lending time period 705, power required to carry out the requested process may be borrowed from power usable by another apparatus.

Because the power lending time period 705 as well as lendable power is sent and received, a power usage right can be prevented from being lent for an unexpectedly long time period, and when an MFP that can lend power for a time period corresponding to a time period required to carry out a requested process is found, power can be borrowed only for that time period.

Although in the embodiment described above, power is borrowed from one MFP that sends a power lending acknowledgement in response to a power lending request, power may be borrowed from a plurality of MFPs when a large amount of power is required.

In this case, borrowed power, lender, lent power, and borrower in the power borrowing-lending table in FIG. 3 can be registered for the plurality of MFPs, and after power lending acknowledgements are received from the respective ones of the plurality of MFPs in the step S507, it is determined whether or not the sum total of lendable power included in the received plurality of power lending acknowledgements is equal to or greater than expected maximum power consumption.

When the sum total of lendable power is smaller than expected maximum power consumption, the process returns to the response receipt time-out determination process in the step S506, and when the sum total of lendable power is equal to or greater than expected maximum power consumption, borrowed power and lender are set in the step S508, and then the process in the step S509 in which a power borrowing starting notification is sent and the subsequent processes are carried out.

Namely, multiple patterns of borrowed power and lenders can be managed, and when power required for a process exceeds lendable power included in a power lending acknowledgement received first, a next power lending acknowledgement is waited for.

When the second power lending acknowledgement is received, and the sum total of lendable power included in it and lendable power included in the first power lending acknowledgement is greater than power required for the process, power is borrowed from the apparatuses that sent the power lending acknowledgements. As a result, even when a a process requires a large amount of power, it is possible to carry out the process.

Thus, in the present embodiment, power required to carry out a process may be borrowed from a plurality of apparatuses.

According to the present invention, maximum power consumption required to carry out a requested process is calculated and compared with allocated effective power. When maximum power consumption is greater than effective power, power corresponding to an excess is borrowed from another MFP to temporarily increase allocated maximum power consumption.

On the other hand, the MFP that lends power decreases effective power by an amount corresponding to lend power. After the requested process is completed by an MFP that borrows power, effective power is returned to original effective power, making it possible to carry out other processes requested to the MFP that lends power itself. Further, because the total amount of maximum power consumption in a specific power control area is not increased, peak cut in the specific power control area can be realized.

According to the embodiment described above, power usage can be limited without interfering execution of a process by an electronic apparatus. Moreover, even when an electronic apparatus carries out a process in the above manner, an electronic apparatus that lends power cannot use lent power, and hence power consumed by a plurality of electronic apparatuses never exceeds a limit.

Although in the above description of the embodiment, an MFP is taken as an exemplary electronic apparatus, the present invention may be applied to any electronic apparatus as long as it has ordinary functions of a PC and is capable of communicating with other apparatuses.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-266224 filed Dec. 5, 2012, which is hereby incorporated by reference herein in its entirety.

What is claimed is:

1. An electronic apparatus comprising:
a determination unit configured to, in a case where the electronic apparatus is requested to execute a process, determine whether power consumption for executing the requested process is greater than a predetermined amount of power;
a notification unit configured to, in a case where the determination unit determines that the power consumption for executing the requested process is greater than the predetermined amount of power, notify another electronic apparatus that the power consumption for executing the requested process is greater than the predetermined amount of power by transmitting a power reallocation notification; and
an execution unit configured to, after the notification unit notifies the other electronic apparatus that the power consumption for executing the requested process is greater than the predetermined amount of power, execute the requested process,
wherein the other electronic apparatus, which has received the power reallocation notification from the notification unit and has reallocated power to the electronic apparatus in response to the power reallocation notification, is limited from sending a power reallocation notification in a case that the other electronic apparatus determines that the power consumption for executing a requested another process is greater than a reduced amount of available power.

2. The electronic apparatus according to claim 1, further comprising a storage unit configured to store in advance a power consumption table showing power required to execute processes by the electronic apparatus, wherein the power consumption is calculated using the power consumption table.

3. The electronic apparatus according to claim 1, wherein the notification unit is configured to, in a case where the execution unit finishes execution of the requested process, notify the other electronic apparatus that the execution of the requested process has finished.

4. The electronic apparatus according to claim 1, wherein a time period for which the execution unit can execute the requested process in a state where the power consumption exceeds the predetermined amount of power is determined in advance.

5. The electronic apparatus according to claim 1, wherein the notification unit is configured to notify a plurality of other electronic apparatus that the power consumption for executing the requested process is greater than the predetermined amount of power.

6. A control method for an electronic apparatus comprising:
a determination step of, in a case where the electronic apparatus is requested to execute a process, determining whether power consumption for executing the requested process is greater than a predetermined amount of power;
a notification step of, in a case where it is determined in the determination step that the power consumption for executing the requested process is greater than the predetermined amount of power, notifying another electronic apparatus that the power consumption for executing the requested process is greater than the predetermined amount of power by transmitting a power reallocation notification; and
an execution step of, after the notification step notifies the other electronic apparatus that the power consumption for executing the requested process is greater than the predetermined amount of power, executing the requested process,
wherein the other electronic apparatus, which has received the power reallocation notification from the notification step and has reallocated power to the electronic apparatus in response to the power reallocation notification, is limited from sending a power reallocation notification in a case that the other electronic apparatus determines that the power consumption for executing a requested another process is greater than a reduced amount of available power.

7. A non-transitory computer-readable storage medium storing a program for causing a computer to execute a control method for an electronic apparatus, the control method comprising:
a determination step of, in a case where the electronic apparatus is requested to execute a process, determining whether power consumption for executing the requested process is greater than a predetermined amount of power;
a notification step of, in a case where it is determined in the determination step that the power consumption for executing the requested process is greater than the predetermined amount of power, notifying another electronic apparatus that the power consumption for executing the requested process is greater than the predetermined amount of power by transmitting a power reallocation notification; and
an execution step of, after the notification step notifies the other electronic apparatus that the power consumption for executing the requested process is greater than the predetermined amount of power, executing the requested process, wherein the other electronic apparatus, which has received the power reallocation notification from the notification step and has reallocated power to the electronic apparatus in response to the power reallocation notification, is limited from sending a power reallocation notification in a case that the other electronic apparatus determines that the power consumption for executing a requested another process is greater than a reduced amount of available power.

* * * * *